US012198600B2

(12) United States Patent
Yu et al.

(10) Patent No.: US 12,198,600 B2
(45) Date of Patent: Jan. 14, 2025

(54) DISPLAY PANEL HAVING THIN-FILM TRANSISTORS

(71) Applicant: Guangzhou China Star Optoelectronics Semiconductor Display Technology Co., LTD., Guangdong (CN)

(72) Inventors: Jing Yu, Guangdong (CN); Juan Xiao, Guangdong (CN)

(73) Assignee: Guangzhou China Star Optoelectronics Semiconductor Display Technology Co., LTD., Guangzhou (CN)

(*) Notice: Subject to any disclaimer, the term of this patent is extended or adjusted under 35 U.S.C. 154(b) by 0 days.

(21) Appl. No.: 17/789,231

(22) PCT Filed: May 31, 2022

(86) PCT No.: PCT/CN2022/096387
§ 371 (c)(1),
(2) Date: Jun. 27, 2022

(87) PCT Pub. No.: WO2023/206699
PCT Pub. Date: Nov. 2, 2023

(65) Prior Publication Data
US 2024/0185760 A1 Jun. 6, 2024

(30) Foreign Application Priority Data
Apr. 28, 2022 (CN) ......................... 202210462671.4

(51) Int. Cl.
*G09G 3/20* (2006.01)

(52) U.S. Cl.
CPC ... *G09G 3/2092* (2013.01); *G09G 2310/0267* (2013.01)

(58) Field of Classification Search
CPC ..................... G09G 3/2092; G09G 2310/0267
See application file for complete search history.

(56) References Cited

U.S. PATENT DOCUMENTS 11,004,380 B2 * 5/2021 Dai ...................... G09G 3/2092
11,159,196 B1 10/2021 Cai
(Continued)

FOREIGN PATENT DOCUMENTS

CN 105913817 8/2016
CN 107274822 10/2017
(Continued)

OTHER PUBLICATIONS

International Search Report and the Written Opinion Dated Dec. 15, 2022 From the International Searching Authority Re. Application No. PCT/CN2022/096387 and Its Translation Into English. (17 Pages).

*Primary Examiner* — Sejoon Ahn

(57) ABSTRACT

The present application relates to a display panel, which includes at least one switching circuit and at least one first-type GOA circuit. The switching circuit is configured to switch and transmit a first signal outputted by the first-type GOA circuit to one of the rows of scan lines connected to the switching circuit and input a second signal to the remaining rows of scan lines connected to the switching circuit. This changes the fact that only one row of scan line can be driven by one GOA circuit in the conventional art, thereby reducing the number of GOA circuits.

16 Claims, 5 Drawing Sheets

(56) References Cited

U.S. PATENT DOCUMENTS

| | | | | |
|---|---|---|---|---|
| 11,776,446 | B1 * | 10/2023 | Shi | G09G 3/20 345/206 |
| 2017/0364170 | A1 * | 12/2017 | Gu | G09G 3/36 |
| 2017/0372168 | A1 * | 12/2017 | Kobayashi | H04N 25/75 |
| 2017/0372665 | A1 * | 12/2017 | Han | G06F 1/1632 |
| 2017/0372666 | A1 * | 12/2017 | Umeyama | G09G 3/36 |
| 2018/0166029 | A1 * | 6/2018 | He | G11C 19/287 |
| 2018/0301103 | A1 * | 10/2018 | Li | G02F 1/136259 |
| 2019/0066617 | A1 * | 2/2019 | Zhao | G11C 19/287 |
| 2019/0147818 | A1 * | 5/2019 | Wang | G09G 3/3674 345/204 |
| 2021/0082334 | A1 * | 3/2021 | Dai | G09G 3/2092 |
| 2021/0151471 | A1 * | 5/2021 | Du | H01L 27/124 |
| 2021/0366397 | A1 * | 11/2021 | Na | H10K 59/1213 |
| 2022/0351663 | A1 * | 11/2022 | Dai | G09G 3/2003 |

FOREIGN PATENT DOCUMENTS

| | | |
|---|---|---|
| CN | 110910775 | 3/2020 |
| CN | 111048051 | 4/2020 |
| CN | 111341243 | 6/2020 |

* cited by examiner

DISPLAY PANEL HAVING THIN-FILM TRANSISTORS

RELATED APPLICATIONS

This application is a National Phase of PCT Patent Application No. PCT/CN2022/096387 having International filing date of May 31, 2022, which claims the benefit of priority of Chinese Patent Application No. 202210462671.4 filed on Apr. 28, 2022. The contents of the above applications are all incorporated by reference as if fully set forth herein in their entirety.

FIELD AND BACKGROUND OF THE INVENTION

The present application relates to display driving technologies, and more particularly to a display panel.

As more and more applications of display technology have been envisioned, users not only put forward new and high requirements on the display performance of display devices but also put forward new and high requirements on the physical size of display devices. For example, the users demand that the display devices (e.g., the display devices employing Fringe Field Switching (FFS)) have a narrow bezel to increase the screen ratio.

SUMMARY OF THE INVENTION

In conventional art, the bezel size of the display devices is reduced by saving the material used to build a Gate IC (gate chip) in a Gate Driver On Array (GOA) design, and this can also reduce the cost. However, there is a need to reduce the bezel size of the display devices to a great extent, and this cannot be done by the aforementioned conventional art.

To solve the problem that the conventional art cannot reduce the bezel size of the display device to a great extent, the embodiments of the present application provide a display panel, including at least one switching circuit and at least one first-type GOA circuit, in which the number of the switching circuits is the same as the number of the first-type GOA circuits;

- an input end of the switching circuit is connected to the first-type GOA circuit, and an output end of the switching circuit is connected to at least two rows of scan lines on a display layer,
- wherein the switching circuit is configured to transmit a first signal outputted by the first-type GOA circuit to one of the rows of scan lines connected to the switching circuit and input a second signal to the remaining rows of scan lines connected to the switching circuit.

The display panel of the present application includes the switching circuit. The input end of the switching circuit is connected to a corresponding first-type GOA circuit, and the output end of the switching circuit is connected to at least two rows of scan lines on the display layer. In practical operations, the switching circuit can switch and transmit the first signal outputted by the first-type GOA circuit to one of the rows of scan lines connected to the switching circuit, and input the second signal to the remaining rows of scan lines connected to the switching circuit. In this way, each first-type GOA circuit can drive at least two rows of scan lines. This changes the fact that only one row of scan line can be driven by one GOA circuit in the conventional art, thereby reducing the number of GOA circuits. Although the switching circuit is newly added, the addition of the switching circuit will reduce the number of the GOA circuits. The area occupied by the GOA circuits is larger than the area occupied by the switching circuit. The addition of one switching circuit can reduce at least one GOA circuit such that the area of a driving layer of the display panel can be reduced. Meanwhile, deploying the switching circuit at the location of the saved space of the GOA circuit can make the room of the driving layer fully utilized, thereby facilitating the narrowing of the bezel of the display device.

BRIEF DESCRIPTION OF THE SEVERAL VIEWS OF THE DRAWINGS

For explaining the technical solutions used in the existing arts or the embodiments of the present application more clearly, the appending figures to be used in describing the existing arts or the embodiments will be briefly introduced below. Obviously, the appending figures described below are only some of the embodiments of the present application, and those of ordinary skill in the art can further obtain other figures according to these figures without making any inventive effort.

DESCRIPTION OF SPECIFIC EMBODIMENTS OF THE INVENTION

For ease of understanding the present application, the present application will be described below more comprehensively with reference to related figures. Preferred embodiments of the present application are shown in the figures. However, the present application may be implemented in many different forms and is not limited to the embodiments described herein. Instead, these embodiments are provided to make the contents disclosed in the present application more thoroughly and comprehensively.

It should be noted that when a component is considered to be "connected" to another component, it can be directly connected to another component and can be combined with it into one body, or an intervening component may simultaneously exist. The terms "mounted", "one end", "another end" or other similar expressions used herein are only for the purpose of description.

Unless defined otherwise, all technical and scientific terms used herein have the same meaning as commonly understood by one of ordinary skill in the art to which the present application belongs. The terms used herein in the specification of the present application are only for the purpose of describing specific embodiments and are not intended to limit the present application. The terms used herein, "and/or", include any and all combinations of one or more of the associated listed items.

Display devices are used to display text, images, videos, and other content. Constantly improving their display performance is crucial to enhancing market competitiveness. At the same time, constantly improving the physical size of the display devices can further enhance the market competitiveness of the display devices. Among them, the size of a bezel of the display device is an example. There are many factors that can affect the bezel size, such as the number of traces and the number of thin-film transistors of a driving circuit. In conventional art, the material used to build the driving circuit is saved to reduce the bezel size, but this approach cannot reduce the bezel size to a great extent.

Figure 1:
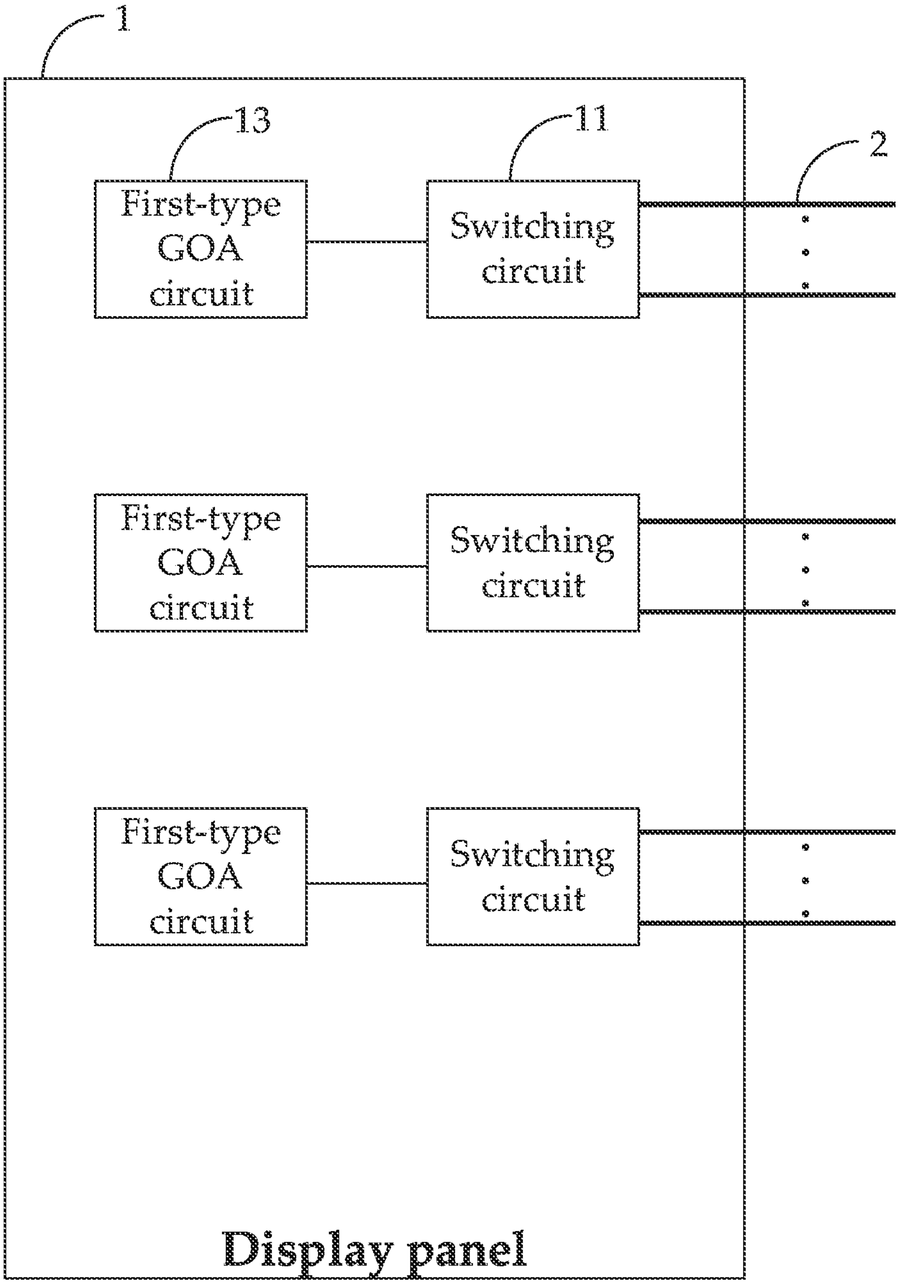
FIG. 1 is a schematic diagram illustrating a driving circuit provided in an embodiment of the present application.

In order to solve the above problems, as shown in FIG. 1, the present application provides a display panel 1. The display panel 1 includes at least one switching circuit 11 and at least one first-type GOA circuit 13. The number of the switching circuits 11 is the same as the number of the first-type GOA circuits 13. A GOA circuit connected to the switching circuit 11 in the display panel 1 is referred to as a first-type GOA circuit 13. Making the number of the switching circuits 11 equal to the number of the first-type GOA circuits 13 can ensure that the switching circuits 11 can be connected to the first-type GOA circuits 13 in a one-to-one correspondence. In other words, one switching circuit 11 is connected to one first-type GOA circuit 13.

An input end of the switching circuit 11 is connected to the first-type GOA circuit 13, and an output end of the switching circuit 11 is connected to at least two rows of scan lines 2 on a display layer. The input end of the switching circuit 11 is configured to receive a first signal outputted by the first-type GOA circuit 13. The first signal is a gate driving signal (Gout signal). The number of the scan lines 2 connected to the output end of the switching circuit 11 can be set based on actual needs. For example, the number of rows of scan lines 2 connected to the output end of the switching circuit 11 can be 2, 3, 4, 5, etc. Taking a resolution of 1920×1080 for example, the number of rows of scan lines 2 connected to the output end of the switching circuit 11 may even be 1080. The number of rows to be connected depends on practical design requirements, and no limit is particularly given on this.

The switching circuit 11 can be connected to the scan lines 2 in a variety of ways. In one example, the number of the switching circuits 11 is one. Similarly, the number of the first-type GOA circuits 13 is also one. The number of rows of scan lines 2 connected to the output end of the switching circuit 11 can be 2, 3, up to a maximum number of rows corresponding to a resolution of the display device. In another example, the number of the scan lines connected to a part of at least two switching circuits 11 is greater than the number of the scan lines connected to another part of the at least two switching circuits 11, and the number of the scan lines connected to a part of the at least two switching circuits 11 is equal to the number of the scan lines connected to another part of the at least two switching circuits 11. In other words, the number of the switching circuits 11 is three or more. The number of the scan lines 2 connected to each of the switching circuits 11 is not exactly the same. It needs to be noted that not being exactly the same can be construed as being partly identical and partly different. For example, when the number of the switching circuits 11 is three, the number of rows of scan lines 2 connected to the output end of a first one of the switching circuits 11 is 3, the number of rows of scan lines 2 connected to the output end of a second one of the switching circuits 11 is 3, and the number of rows of scan lines 2 connected to the output end of a third one of the switching circuits 11 is 4; when the number of the switching circuits 11 is four, the number of rows of scan lines 2 connected to the output end of a first one of the switching circuits 11 is 3, the number of rows of scan lines 2 connected to the output end of a second one of the switching circuits 11 is 3, the number of rows of scan lines 2 connected to the output end of a third one of the switching circuits 11 is 4, and the number of rows of scan lines 2 connected to the output end of a fourth one of the switching circuits 11 is 5. For another example, the switching circuits 11 can be divided into two parts, wherein one part of the switching circuits 11 is connected to a same number of scan lines 2, and the other part of the switching circuits 11 is connected to another same number of scan lines 2. In one example, the number of rows of scan lines connected to a part of at least two switching circuits 11 is two, and the number of rows of scan lines connected to the other part of the at least two switching circuits 11 is three.

In still another example, the number of the scan lines connected to a part of at least two switching circuits 11 is greater than the number of the scan lines connected to another part of the at least two switching circuits 11. In other words, the number of the switching circuits 11 is two or more. The number of the scan lines 2 connected to each of the switching circuits 11 is different from each other. For example, when the number of the switching circuits 11 is four, the number of rows of scan lines 2 connected to the output end of a first one of the switching circuits 11 is 3, the number of rows of scan lines 2 connected to the output end of a second one of the switching circuits 11 is 4, the number of rows of scan lines 2 connected to the output end of a third one of the switching circuits 11 is 5, and the number of rows of scan lines 2 connected to the output end of a fourth one of the switching circuits 11 is 6.

In yet another example, the number of the switching circuits 11 is two or more. The number of the scan lines 2 connected to each of the switching circuits 11 is different from each other. For example, when the number of the switching circuits 11 is four, the number of rows of scan lines 2 connected to the output end of a first one of the switching circuits 11 is 3, the number of rows of scan lines 2 connected to the output end of a second one of the switching circuits 11 is 4, the number of rows of scan lines 2 connected to the output end of a third one of the switching circuits 11 is 5, and the number of rows of scan lines 2 connected to the output end of a fourth one of the switching circuits 11 is 6.

In yet another example, the number of the scan lines connected to a part of at least two switching circuits 11 is equal to the number of the scan lines connected to another part of the at least two switching circuits 11. In other words, the number of the switching circuits 11 is two or more. The number of the scan lines 2 connected to each of the switching circuits 11 is exactly the same. For example, the number of rows of scan lines 2 connected to the switching circuit 11 is two. For another example, the number of rows of scan lines 2 connected to the switching circuit 11 is three.

Figure 2:
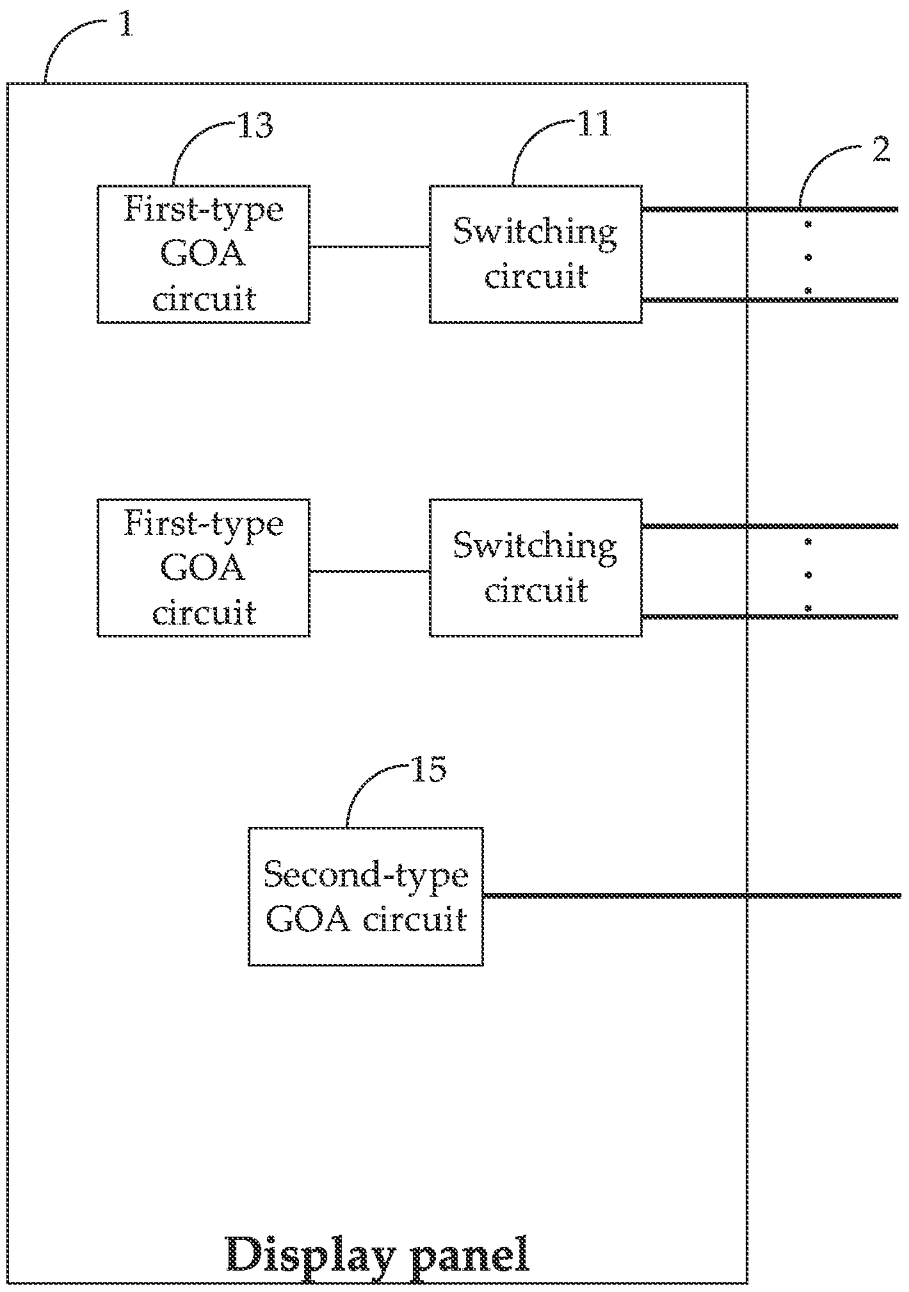
FIG. 2 is another schematic diagram illustrating a driving circuit provided in an embodiment of the present application.

In addition, all of the scan lines 2 can be connected to the switching circuit(s) 11 based on actual needs, or only a part of the scan lines 2 are connected to the switching circuit(s) 11. In an example, as shown in FIG. 2, the display layer includes scan line(s) 2 that is/are not connected with the switching circuit(s) 11. The display panel 1 further includes a second-type GOA circuit 15. The output end of the second-type GOA circuit 15 is connected to a corresponding scan line 2 that is not connected with the switching circuit(s) 11. It needs to be noted that the first-type GOA circuit 13 and the second-type GOA circuit 15 are classified based on whether they are directly connected to the scan lines 2, having nothing to do with the specific structure of the GOA circuit. In this example, the scan lines 2 on the display layer are divided into two parts, in which one part is connected to the first-type GOA circuit(s) 13 via the switching circuit(s) 11, and the other part is connected to the second-type GOA circuit(s) 15 via the switching circuit(s) 11. The second-type GOA circuit(s) 15 directly transmits a gate driving signal to the scan line(s) 2 connected with the switching circuit(s). In another example, all the scan lines 2 on the display layer are connected to corresponding switching circuits 11. In other words, the GOA circuits are not directly connected to the scan lines 2. The number of the GOA circuits reduced in this example is more than the previous example. Therefore, the effect of bezel size reduction in this example is more remarkable than the previous example.

The implementation of the switching circuit 11 will be described in detail below. The switching circuit 11 is configured to switch and transmit a first signal outputted by the first-type GOA circuit 13 to one of the rows of scan lines 2 connected to the switching circuit and input a second signal to the remaining rows of scan lines 2 connected to the switching circuit. In other words, the switching circuit 11 has a conduction switching function. The first-type GOA circuit 13 is switched to electrically connect to a certain row of scan line 2 at different time points. For example, there are two rows of scan lines 2 connected to the output end of the switching circuit 11. At a first time point, the switching circuit 11 switches a first GOA circuit to electrically connect to one of the rows of scan lines 2 in the switching circuit such that the first GOA circuit transmits the first signal using the one of the rows of scan lines. At a second time point, the switching circuit 11 switches the first GOA circuit to electrically connect to the other one of the rows of scan lines 2 in the switching circuit such that the first GOA circuit transmits the first signal using the other one of the rows of scan lines. The second signal is a low-level signal. The first signal may be a low-level signal or a high-level signal. The high-level signal is used to drive the scan line 2, and the low-level signal is used to inhibit the scan line 2.

The switching circuit 11 can be implemented in various ways. Two possible ways are described below.

Figure 3:
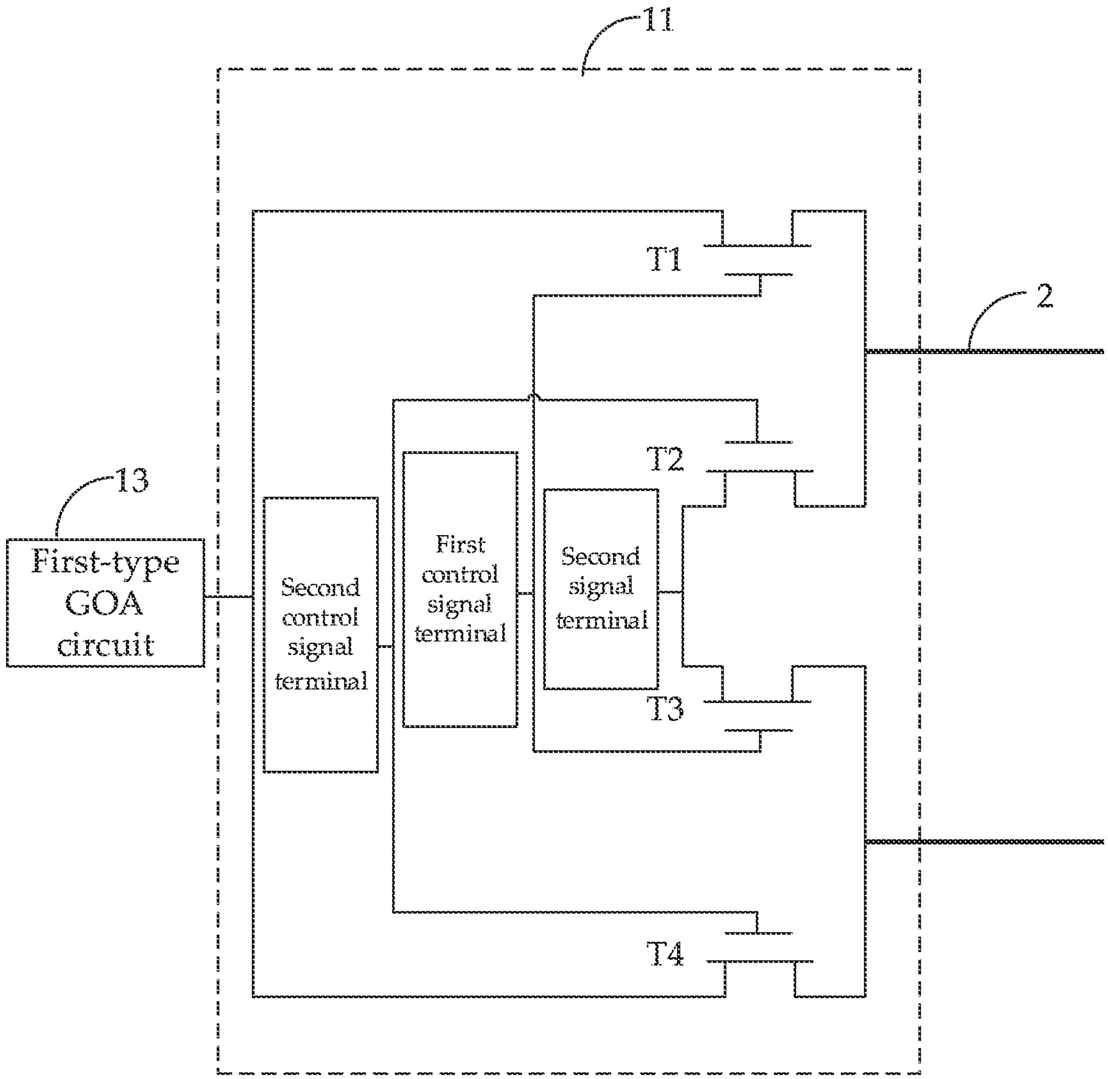
FIG. 3 is a schematic diagram illustrating a switching circuit provided in an embodiment of the present application.

In one example, as shown in FIG. 3, in a case that the number of rows of scan lines 2 connected to the switching circuit 11 is two, the switching circuit 11 includes a first thin-film transistor T1, a second thin-film transistor T2, a third thin-film transistor T3 and a fourth thin-film transistor T4; a source of the first thin-film transistor T1 is connected to the first-type GOA circuit 13, a drain of the first thin-film transistor T1 is connected to one row of scan line 2, and a gate of the first thin-film transistor T1 is connected to a first control signal terminal; the source of the second thin-film transistor T2 is connected to a second signal terminal, the drain of the second thin-film transistor T2 is connected to the one row of scan line 2, and the gate of the second thin-film transistor T2 is connected to a second control signal terminal; the source of the third thin-film transistor T3 is connected to the second signal terminal, the drain of the third thin-film transistor T3 is connected to another row of scan line 2, and the gate of the third thin-film transistor T3 is connected to the first control signal terminal; the source of the fourth thin-film transistor T4 is connected to the first-type GOA circuit 13, the drain of the fourth thin-film transistor T4 is connected to the another row of scan line 2, and the gate of the fourth thin-film transistor T4 is connected to the second control signal terminal.

The working process of the above structure will be described in detail with reference to the specific embodiment shown in FIG. 3 and a signal diagram shown in FIG. 4.

Figure 4:
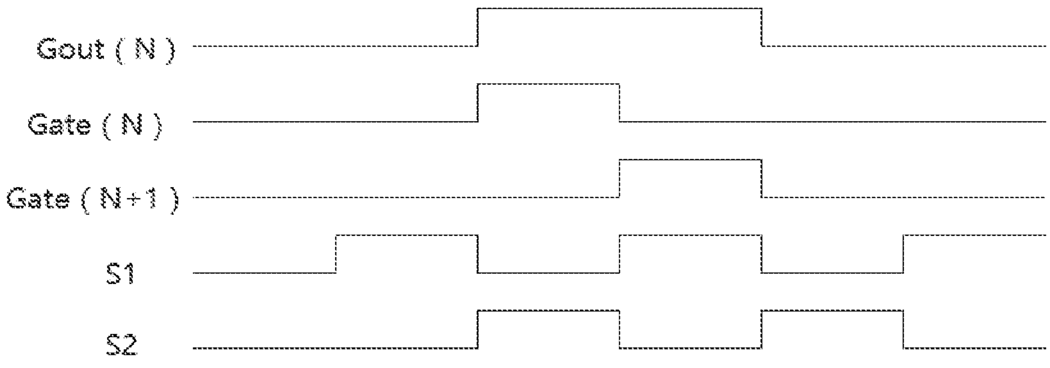
FIG. 4 is a signal waveform diagram corresponding to the switching circuit of FIG. 3.

The first signal (e.g., Gout (N) in FIG. 4) outputted by the first-type GOA circuit 13 of a certain stage is a high-level signal, a first control signal (e.g., S1 in FIG. 4) inputted from the first control signal terminal is a high-level signal, and a second control signal (e.g., S2 in FIG. 4) inputted from the second control signal terminal is a low-level signal. The first thin-film transistor T1 and the third thin-film transistor T3 are turned on. The first-type GOA circuit 13 transmits, via the first thin-film transistor T1, the first signal to the scan line 2 connected to the first thin-film transistor T1, and the switching circuit 11 transmits, via the third thin-film transistor T3, the second signal to the scan line 2 connected to the third thin-film transistor T3.

Similarly, the first signal outputted by the first-type GOA circuit 13 of the same stage is a high-level signal, the first control signal inputted from the first control signal terminal is a low-level signal, and the second control signal inputted from the second control signal terminal is a high-level signal. The second thin-film transistor T2 and the fourth thin-film transistor T4 are turned on. The first-type GOA circuit 13 transmits, via the fourth thin-film transistor T4, the first signal to the scan line 2 connected to the fourth thin-film transistor T4, and the switching circuit 11 transmits, via the second thin-film transistor T2, the second signal to the scan line 2 connected to the second thin-film transistor T2. It needs to be noted that Gate (N) in FIG. 4 is a (N)th-stage scan signal, and Gate (N+1) is a (N+1)th-stage scan signal.

In order to ensure that only one row of scan line 2 transmits the high-level signal, in one example, the display panel 1 only includes the first-type GOA circuits 13, and all of the rest of stages of the first-type GOA circuits 13 output the low-level signals. The first control signal terminal or the third control signal terminal outputs the high-level signal. In another example, the display panel 1 includes the first-type GOA circuits 13 and the second-type GOA circuits 15, and the rest of stages of the first-type GOA circuits 13 and all of the stages of the second-type GOA circuits 15 output the low-level signals. Correspondingly, if there is one stage of the second-type GOA circuits 15 that inputs the high-level signal to the scan line 2 connected to the switching circuit, all of the stages of the first-type GOA circuits 13 and the rest of stages of the second-type GOA circuits 15 output the low-level signals.

In another example, in a case that the number of rows of scan lines 2 connected to the switching circuit 11 is three, the switching circuit 11 includes a first thin-film transistor T1, a second thin-film transistor T2, a third thin-film transistor T3, a fourth thin-film transistor T4, a fifth thin-film transistor T5, a sixth thin-film transistor T6, a seventh thin-film transistor T7, an eighth thin-film transistor T8 and a ninth thin-film transistor T9; a source of the first thin-film transistor T1 is connected to the first-type GOA circuit 13, a drain of the first thin-film transistor T1 is connected to the scan line of a first row 2, and a gate of the first thin-film transistor T1 is connected to a first control signal terminal; the source of the second thin-film transistor T2 is connected to a second signal terminal, the drain of the second thin-film transistor T2 is connected to the scan line 2 of the first row, and the gate of the second thin-film transistor T2 is connected to a second control signal terminal; the source of the third thin-film transistor T3 is connected to the second signal terminal, the drain of the third thin-film transistor T3 is connected to the scan line 2 of the first row, and the gate of the third thin-film transistor T3 is connected to a third control signal terminal;

the source of the fourth thin-film transistor T4 is connected to the first-type GOA circuit 13, the drain of the fourth thin-film transistor T4 is connected to the scan line 2 of a second row, and the gate of the fourth thin-film transistor T4 is connected to the second control signal terminal; the source of the fifth thin-film transistor T5 is connected to the second signal terminal, the drain of the fifth thin-film transistor T5 is connected to the scan line 2 of the second row, and the gate of the fifth thin-film transistor T5 is connected to the first control signal terminal; the source of the sixth thin-film transistor T6 is connected to the second signal terminal, the drain of the sixth thin-film transistor T6 is connected to the scan line 2 of the second row, and the gate of the sixth thin-film transistor is connected to the third control signal terminal; the source of the seventh thin-film transistor T7 is connected to the first-type GOA circuit 13, the drain of the seventh thin-film transistor T7 is connected to the scan line 2 of a third row, and the gate of the seventh thin-film transistor T7 is connected to the third control signal terminal; the source of the eighth thin-film transistor T8 is connected to the second signal terminal, the drain of the eighth thin-film transistor T8 is connected to the scan line 2 of the third row, and the gate of the eighth thin-film transistor T8 is connected to the first control signal terminal; the source of the ninth thin-film transistor T9 is connected to the second signal terminal, the drain of the ninth thin-film transistor T9 is connected to the scan line 2 of the third row, and the gate of the ninth thin-film transistor T9 is connected to the second control signal terminal.

Figure 5:
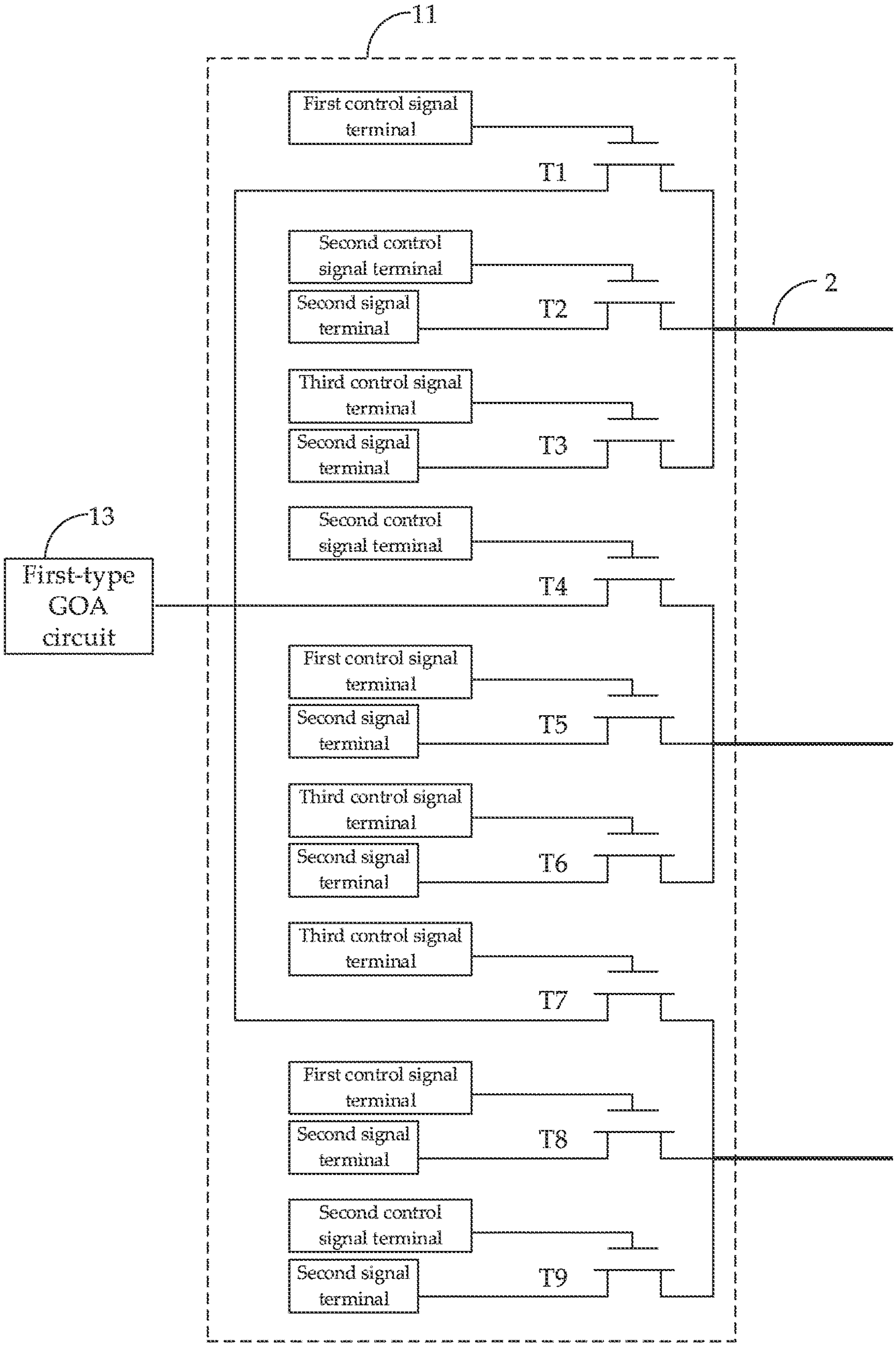
FIG. 5 is another schematic diagram illustrating a switching circuit provided in an embodiment of the present application.

The working process of the above structure will be described in detail with reference to the specific embodiment shown in FIG. 5 and a signal diagram shown in FIG. 6.

Figure 6:
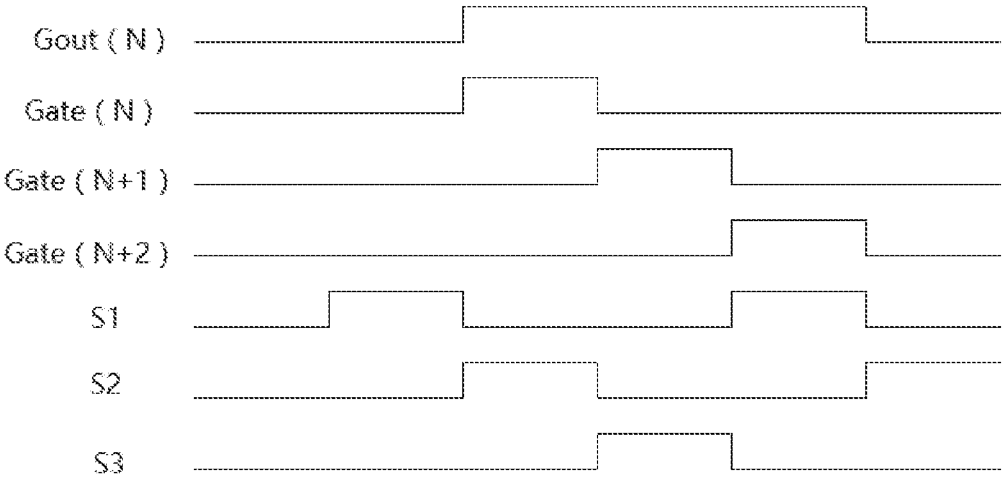
FIG. 6 is a signal waveform diagram corresponding to the switching circuit of FIG. 5.

The first signal (e.g., Gout (N) in FIG. 6) outputted by the first-type GOA circuit 13 of a certain stage is a high-level signal, a first control signal (e.g., S1 in FIG. 6) inputted from the first control signal terminal is a high-level signal, a second control signal (e.g., S2 in FIG. 6) inputted from the second control signal terminal is a low-level signal, and a third control signal (e.g., S3 in FIG. 6) inputted from the third control signal terminal is a low-level signal. The first thin-film transistor T1, the fifth thin-film transistor T5 and the eighth thin-film transistor T8 are turned on, and the rest of thin-film transistors are turned off. The first-type GOA circuit 13 of the stage transmits, via the first thin-film transistor T1, the first signal to the scan line 2 connected to the first thin-film transistor T1, the switching circuit 11 transmits, via the fifth thin-film transistor T5, the second signal to the scan line 2 connected to the fifth thin-film transistor T5, and the switching circuit 11 transmits, via the eighth thin-film transistor T8, the second signal to the scan line 2 connected to the eighth thin-film transistor T8. It needs to be noted that Gate (N) in FIG. 6 is a (N)th-stage scan signal, Gate (N+1) is a (N+1)th-stage scan signal, and Gate (N+2) is a (N+2)th-stage scan signal.

Similarly, the first signal outputted by the first-type GOA circuit 13 of the same stage is a high-level signal, the first control signal inputted from the first control signal terminal is a low-level signal, the second control signal inputted from the second control signal terminal is a high-level signal, and the third control signal inputted from the third control signal terminal is a low-level signal. The second thin-film transistor T2, the fourth thin-film transistor T4 and the ninth thin-film transistor T9 are turned on, and the rest of thin-film transistors are turned off. The first-type GOA circuit 13 of the same stage transmits, via the fourth thin-film transistor T4, the first signal to the scan line 2 connected to the fourth thin-film transistor T4, the switching circuit 11 transmits, via the second thin-film transistor T2, the second signal to the scan line 2 connected to the second thin-film transistor T2, and the switching circuit 11 transmits, via the ninth thin-film transistor T9, the second signal to the scan line 2 connected to the ninth thin-film transistor T9.

Similarly, the first signal outputted by the first-type GOA circuit 13 of the same stage is a high-level signal, the first control signal inputted from the first control signal terminal is a low-level signal, the second control signal inputted from the second control signal terminal is a low-level signal, and the third control signal inputted from the third control signal terminal is a high-level signal. The third thin-film transistor T3, the sixth thin-film transistor T6 and the seventh thin-film transistor T7 are turned on, and the rest of thin-film transistors are turned off. The first-type GOA circuit 13 of the same stage transmits, via the seventh thin-film transistor T7, the first signal to the scan line 2 connected to the seventh thin-film transistor T7, the switching circuit 11 transmits, via the third thin-film transistor T3, the second signal to the scan line 2 connected to the third thin-film transistor T3, and the switching circuit 11 transmits, via the sixth thin-film transistor T6, the second signal to the scan line 2 connected to the sixth thin-film transistor T6.

In order to ensure that only one row of scan line 2 transmits the high-level signal, in one example, the display panel 1 only includes the first-type GOA circuits 13, and all of the rest of stages of the first-type GOA circuits 13 output the low-level signals. Any one of the first control signal terminal, the second control signal terminal or the third control signal terminal outputs the high-level signal. In another example, the display panel 1 includes the first-type GOA circuits 13 and the second-type GOA circuits 15, and the rest of stages of the first-type GOA circuits 13 and all of the stages of the second-type GOA circuits 15 output the low-level signals. Correspondingly, if there is one stage of the second-type GOA circuits 15 that inputs the high-level signal to the scan line 2 connected to the switching circuit, all of the stages of the first-type GOA circuits 13 and the rest of stages of the second-type GOA circuits 15 output the low-level signals.

In one example, the display panel further includes a main control board electrically connected to the first-type GOA circuit. The main control board is used to control the first-type GOA circuit. In another example, the main control board is also connected to the second-type GOA circuit 15.

The display panel of the present application includes the switching circuit. The input end of the switching circuit is connected to a corresponding first-type GOA circuit, and the output end of the switching circuit is connected to at least two rows of scan lines on the display layer. In practical operations, the switching circuit can switch and transmit the first signal outputted by the first-type GOA circuit to one of the rows of scan lines connected to the switching circuit, and input the second signal to the remaining rows of scan lines connected to the switching circuit. In this way, each first-type GOA circuit can drive at least two rows of scan lines. This changes the fact that only one row of scan line can be driven by one GOA circuit in the conventional art, thereby reducing the number of GOA circuits. Although the switching circuit is newly added, the addition of the switching circuit will reduce the number of the GOA circuits. The area occupied by the GOA circuits is larger than the area occupied by the switching circuit. The addition of one switching circuit can reduce at least one GOA circuit such that the area of a driving layer of the display panel can be reduced. Meanwhile, deploying the switching circuit at the location of saved space of the GOA circuit can make the room of the driving layer fully utilized, thereby facilitating the narrowing of the bezel of the display device. Each technical feature of the embodiments may be freely combined, and for brief description, not all possible combinations of each technical characteristic in the embodiments are described. However, all the combinations of these technical characteristics shall fall within the scope recorded in the specification without conflicts.

The afore-described embodiments only express some implementation modes of the present application, and relatively specific and detailed descriptions are made thereto but should not thus be understood as limits to the scope of the application. It is to be pointed out that those of ordinary skill in the art may further make a plurality of transformations and improvements without departing from the concept of the present application and all of them fall within the scope of protection of the present application. Therefore, the scope of protection of the present application shall be subject to the scope of protection in the claims.

The invention claimed is:

1. A display panel having thin-film transistors, comprising one or more switching circuits and one or more first-type Gate Driver On Array (GOA) circuits, in which the number of the switching circuits is the same as the number of the first-type GOA circuits;

wherein an input end of the switching circuit is connected to the first-type GOA circuit, and an output end of the switching circuit is connected to at least two rows of scan lines on a display layer;

wherein the first-type GOA circuit is configured to output a first signal, and the switching circuit is configured to transmit the first signal to one of the at least two rows of scan lines connected to the switching circuit and input a second signal to another of the at least two rows of scan lines connected to the switching circuit; and wherein the switching circuit comprises a first thin-film transistor, a second thin-film transistor, a third thin-film transistor, and a fourth thin-film transistor;

a source of the first thin-film transistor is connected to the first-type GOA circuit, a drain of the first thin-film transistor is connected to a first row of the at least two rows of scan lines, and a gate of the first thin-film transistor is connected to a first control signal terminal;

wherein the source of the second thin-film transistor is connected to a second signal terminal, the drain of the second thin-film transistor is connected to the first row of the at least two rows of scan lines, and the gate of the second thin-film transistor is connected to a second control signal terminal;

wherein the source of the third thin-film transistor is connected to the second signal terminal, and the drain of the third thin-film transistor is connected to the first row of the at least two rows of scan lines or a second row of the at least two rows of scan lines; and wherein the source of the fourth thin-film transistor is connected to the first-type GOA circuit, the drain of the fourth thin-film transistor is connected to the second row of the at least two rows of scan lines, and the gate of the fourth thin-film transistor is connected to the second control signal terminal.

2. The display panel of claim 1, wherein the number of the at least two rows of scan lines connected to the switching circuit is two, and the gate of the third thin-film transistor is connected to the first control signal terminal.

3. The display panel of claim 2, wherein the display layer comprises a scan line that is not connected with the switching circuit;

the display panel further comprises a second-type GOA circuit;

the output end of the second-type GOA circuit is connected to the scan line that is not connected with the switching circuit.

4. The display panel of claim 1, wherein in a case that the number of at least two rows of scan lines connected to the switching circuit is three, the switching circuit further comprises a fifth thin-film transistor, a sixth thin-film transistor, a seventh thin-film transistor, an eighth thin-film transistor and a ninth thin-film transistor;

the gate of the third thin-film transistor is connected to a third control signal terminal;

the source of the fifth thin-film transistor is connected to the second signal terminal, the drain of the fifth thin-film transistor is connected to the scan line of the second row, and the gate of the fifth thin-film transistor is connected to the first control signal terminal;

the source of the sixth thin-film transistor is connected to the second signal terminal, the drain of the sixth thin-film transistor is connected to the scan line of the second row, and the gate of the sixth thin-film transistor is connected to the third control signal terminal;

the source of the seventh thin-film transistor is connected to the first-type GOA circuit, the drain of the seventh thin-film transistor is connected to the scan line of a third row, and the gate of the seventh thin-film transistor is connected to the third control signal terminal;

the source of the eighth thin-film transistor is connected to the second signal terminal, the drain of the eighth thin-film transistor is connected to the scan line of the third row, and the gate of the eighth thin-film transistor is connected to the first control signal terminal;

the source of the ninth thin-film transistor is connected to the second signal terminal, the drain of the ninth thin-film transistor is connected to the scan line of the third row, and the gate of the ninth thin-film transistor is connected to the second control signal terminal.

5. The display panel of claim 4, wherein the display layer comprises a scan line that is not connected with the switching circuit;

the display panel further comprises a second-type GOA circuit;

the output end of the second-type GOA circuit is connected to a corresponding scan line that is not connected with the switching circuit.

6. The display panel of claim 1, wherein the switching circuits is divided to a first part of the switching circuits and a second part of the switching circuits; the number of the at least two rows of scan lines connected to the first part of the switching circuits is greater than the number of the at least two rows of scan lines connected to the second part of the switching circuits.

7. The display panel of claim 6, wherein the display layer comprises a scan line that is not connected with the switching circuit;

the display panel further comprises a second-type GOA circuit;

the output end of the second-type GOA circuit is connected to the scan line that is not connected with the switching circuit.

8. The display panel of claim 1, wherein the switching circuits is divided to a first part of the switching circuits and a second part of the switching circuits; the number of the at least two rows of scan lines connected to the first part of the switching circuits is equal to the number of the at least two rows of scan lines connected to the second part of the switching circuits.

9. The display panel of claim 8, wherein the display layer comprises a scan line that is not connected with the switching circuit;

the display panel further comprises a second-type GOA circuit;

the output end of the second-type GOA circuit is connected to the scan line that is not connected with the switching circuit.

10. The display panel of claim 4, wherein the number of the at least two rows of scan lines connected to a part of at least two switching circuits is two, and the number of rows of scan lines connected to another part of the at least two switching circuits is three.

11. The display panel of claim 10, wherein the display layer comprises a scan line that is not connected with the switching circuit;

the display panel further comprises a second-type GOA circuit;

the output end of the second-type GOA circuit is connected to the scan line that is not connected with the switching circuit.

12. The display panel of claim 6, wherein the number of the at least two rows of scan lines connected to the switching circuit is two; or the number of the at least two rows of scan lines connected to the switching circuit is three.

13. The display panel of claim 12, wherein the display layer comprises a scan line that is not connected with the switching circuit;

the display panel further comprises a second-type GOA circuit;

the output end of the second-type GOA circuit is connected to the scan line that is not connected with the switching circuit.

14. The display panel of claim 1, further comprising a main control board electrically connected to the first-type GOA circuit.

15. A display panel, comprising at least one switching circuit and at least one first-type Gate Driver On Array (GOA) circuit, in which the number of the switching circuits is the same as the number of the first-type GOA circuits;

wherein an input end of the switching circuit is connected to the first-type GOA circuit, and an output end of the switching circuit is connected to at least two rows of scan lines on a display layer;

wherein the first-type GOA circuit is configured to output a first signal, the switching circuit is configured to transmit the first signal to one of the at least two rows of the scan lines connected to the switching circuit and input a second signal to another of the at least two rows of the scan lines connected to the switching circuit;

wherein the switching circuit comprises a first thin-film transistor, a second thin-film transistor, a third thin-film transistor and a fourth thin-film transistor; a source of the first thin-film transistor is connected to the first-type GOA circuit, a drain of the first thin-film transistor is connected to a first row of the at least two rows of the scan lines, and a gate of the first thin-film transistor is connected to a first control signal terminal; the source of the second thin-film transistor is connected to a second signal terminal, the drain of the second thin-film transistor is connected to the first row of the at least two rows of the scan lines, and the gate of the second thin-film transistor is connected to a second control signal terminal; the source of the third thin-film transistor is connected to the second signal terminal, the drain of the third thin-film transistor is connected to a second row of the at least two rows of the scan lines, and the gate of the third thin-film transistor is connected to the first control signal terminal; the source of the fourth thin-film transistor is connected to the first-type GOA circuit, the drain of the fourth thin-film transistor is connected to the second row of the at least two rows of the scan lines, and the gate of the fourth thin-film transistor is connected to the second control signal terminal; and wherein the number of rows of scan lines connected to a part of at least two switching circuits is two, and the number of rows of scan lines connected to another part of the at least two switching circuits is three.

16. A display panel, comprising at least one switching circuit and at least one first-type Gate Driver On Array (GOA) circuit, in which the number of the switching circuits is the same as the number of the first-type GOA circuits;

wherein an input end of the switching circuit is connected to the first-type GOA circuit, and an output end of the switching circuit is connected to at least two rows of scan lines on a display layer;

wherein the first-type GOA circuit is configured to output a first signal, the switching circuit is configured to transmit the first signal to one of the at least two rows of the scan lines connected to the switching circuit and input a second signal to another of the at least two rows of the scan lines connected to the switching circuit;

wherein the switching circuit comprises a first thin-film transistor, a second thin-film transistor, a third thin-film transistor, a fourth thin-film transistor, a first thin-film transistor, a second thin-film transistor, a third thin-film transistor, a fourth thin-film transistor; a source of the first thin-film transistor is connected to the first-type GOA circuit, a drain of the first thin-film transistor is connected to a first row of the at least two rows of the scan lines, and a gate of the first thin-film transistor is connected to a first control signal terminal; the source of the second thin-film transistor is connected to a second signal terminal, the drain of the second thin-film transistor is connected to the first row of the at least two rows of the scan lines, and the gate of the second thin-film transistor is connected to a second control signal terminal; the source of the third thin-film transistor is connected to the second signal terminal, the drain of the third thin-film transistor is connected to the first row of the at least two rows of the scan lines, and the gate of the third thin-film transistor is connected to a third control signal terminal; the source of the fourth thin-film transistor is connected to the first-type GOA circuit, the drain of the fourth thin-film transistor is connected to the second row of the at least two rows of the scan lines, and the gate of the fourth thin-film transistor is connected to the second control signal terminal;

wherein the source of the fifth thin-film transistor is connected to the second signal terminal, the drain of the fifth thin-film transistor is connected to the scan line of the second row, and the gate of the fifth thin-film transistor is connected to the first control signal terminal;

wherein the source of the sixth thin-film transistor is connected to the second signal terminal, the drain of the sixth thin-film transistor is connected to the scan line of the second row, and the gate of the sixth thin-film transistor is connected to the third control signal terminal;

wherein the source of the seventh thin-film transistor is connected to the first-type GOA circuit, the drain of the seventh thin-film transistor is connected to the scan line of a third row, and the gate of the seventh thin-film transistor is connected to the third control signal terminal;

wherein the source of the eighth thin-film transistor is connected to the second signal terminal, the drain of the eighth thin-film transistor is connected to the scan line of the third row, and the gate of the eighth thin-film transistor is connected to the first control signal terminal;

wherein the source of the ninth thin-film transistor is connected to the second signal terminal, the drain of the ninth thin-film transistor is connected to the scan line of the third row, and the gate of the ninth thin-film transistor is connected to the second control signal terminal; and wherein the number of the at least two rows of scan lines connected to a part of at least two switching circuits is two, and the number of rows of scan lines connected to another part of the at least two switching circuits is three.

* * * * *